United States Patent Office 3,382,203
Patented May 7, 1968

3,382,203
POLYESTERS AND INSULATING COATINGS FOR ELECTRICAL CONDUCTORS MADE THEREFROM
Wilhelm Rating, Wuppertal-Barmen, Gerhard Koch, Wuppertal-Elberfeld, and Bernd von Bornhaupt, Wuppertal-Barmen, Germany, assignors to Dr. Kurt Herberts & Co., Wuppertal-Barmen, Germany, a corporation of Germany
No Drawing. Filed Oct. 8, 1963, Ser. No. 314,636
Claims priority, application Germany, Oct. 11, 1962, H 47,121; Oct. 13, 1962, H 47,139
9 Claims. (Cl. 260—33.4)

The present invention relates to insulating coatings on electrical conductors, in particular such coatings which are suitable for the load stresses of thermal classes F and H (VDE 0530, section 32).

It is known to produce electrical conductors having a polyester resin insulation in the manner whereby 36–50 equivalent percent of an ester of terephthalic acid with a lower aliphatic alcohol, e.g. of terephthalic acid dimethyl ester, and about 20–32 equivalent percent glycerin are heated together in a reaction vessel until a sufficient viscosity is reached, whereafter the resins thus obtained are deposited on a wire in the form of an impregnating solution to be condensed out from the latter. Many attempts have been made to produce electric conductors having equally good or better properties, using similar starting materials. The attempts have only shown however that the aforementioned process is restricted to the alkyl esters of terephthalic acid, ethylene glycol and glycerin and that deviations from the aforestated composition lead to qualitative deterioration.

The hitherto known lacquer wire insulations, as specified for the application range of the thermal class F, often do not meet the requirements of present-day electric machine constructions in the preferred compact aggregates. When investigating the reason of these failures, in high-performance small motors for example, it is found that the cause of numerous failures are faults between turns, brought about by a plastification of the insulating lacquer layer of the windings under a heavy thermal stress. This can be demonstrated only by unwinding the armature of electric motors after load tests or after overloading in a test bank run. This allows to observe the more or less deep impressions at the cross-over points, proportional to the thermal and compressive load.

It is an object of the present invention to provide an improved synthetic polyester resin for insulating electrical conductors.

Another object of the present invention is to provide improved insulating coatings on electrical conductors which do not have the above mentioned disadvantages of the prior known insulating coatings.

Still another object of the present invention is to provide an improved insulating coating composition for electrical conductors.

Further objects of the present invention and advantages thereof will become apparent as the description proceeds.

It has been found, that improved insulating coatings can be produced on electrical conductors by coating the latter with an impregnating solution of hardening, modified polyester resins on basis of mixed esters containing aromatic polycarboxylic acid radicals and radicals of di- and/or polyhydric alcohols, possibly with the addition of hardening catalysts, and heating the coated conductors to about 400° C., if such hardening polyester resins are used which contain as aromatic polycarboxylic acid radicals the radicals of benzene polycarboxylic acids having more than two carboxy groups and having two carboxylic groups in the ortho-position to each other which radicals may be admixed partly with radicals of terephthalic and/or isophthalic acid, and which contain for every 10 equivalents of intracondensed aromatic polycarboxylic and possibly dicarboxylic radicals about 5–16, preferably 7–10 equivalents of introcondensed di- and/or polyhydric lower aliphatic alcohol radicals and about 3–0.8 equivalents of intracondensed diamine radicals containing the groupment

which may be partly substituted by radicals of amino acids or amino alcohols, and for every 10 equivalents of divalent radicals about 4–20, preferably 6–15 equivalents of polyvalent radicals. Such resins advantageously further contain chemically bound titanium or zirconium atoms in amounts of 0.05 to 0.5 g., preferably 0.1 to 0.2 g. of said metals for every 100 g. of the polyester resins.

Preferably such polyester resins are used, which have been condensed to such an extent that their 1:2 solutions in m-cresol have viscosities between 900 and 2000 cp., preferably between 1400 and 1500 cp. at 25° C.

The preferred acid starting materials for the polyester resins are the anhydrides of the benzene polycarboxylic acids. Especially suitable for this purpose are the anhydrides of 1,2,4-benzene-tricarboxylic acid (trimellitic acid) and of 1,2,4,5-benzene-tetracarboxylic acid (pyromellitic acid) or mixtures of these anhydrides or of their partial esterification products. Terephthalic acids is preferably used in form of its dimethyl ester, but free terephthalic acid can be used equally advantageously. The diamines primarily suitable are the aromatic diamines containing the groupment

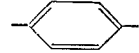

such as for example phenylenediamine, 4,4'-diaminodiphenyl-methane, 4,4'-diaminodiphenyl-dimethyl-methane, 4,4'-dimainodiphenyl-ether, diaminodiphenyl-sulphones as well as the corresponding derivatives with hydrated phenyl nuclei. The diamines may be substituted partially by amino acids, preferably aminobenzene carboxylic acids, such as p-aminobenzoic acid, or amino alcohols, such as ethanolamines, aminopropanol, aminophenols. The following dihydric and polyhydric lower aliphatic alcohols are suitable for simultaneously effecting the polyester bond: ethylene glycol, diethylene glycol, 1,2-propanediol, 2,2-dimethyl-1,3-propanediol, glycerin, trimethylol-propane, trimethylol-ethane and mixtures of the aforementioned alcohols.

Polyvalent compounds or radicals in the meaning of the invention are such compounds or radicals which contain more than two corresponding functional groups in the molecule.

Particularly advantageous in the sense of the invention is the use of such polyester resins which contain radicals of trimellithic acid and/or pyromellithic acid and, possibly, terephthalic acid, ethylene glycol, glycerol and/or trimethylol propane, and 4,4'-diaminodiphenylmethane, p-aminobenzoic acid and/or aminoethanol as well as possibly titanium and/or zirconium, condensed therein.

The polyester resins are prepared by heating the starting materials at temperatures in the range of about 100° C. to about 270° C.

For the preparation of the hardening polyester resins employed according to the invention, there are used as starting materials, expediently, lower-condensed ester-precursors of polycarboxylic acids or of their partial anhydrides with the aforenamed polyhydric alcohol, for example bis-oxyalkyl-terephthalate, trioxyalkyl-trimellitic acid ester, tetraoxyalkyl-pyromellitic acid ester and their mixtures. The preparation of these esters is effected in the known manner from the acids or from their lower alkyl esters, anhydrides and acid anhydrides with addition of esterification catalysts and possibly carrier agents were sublimate precipitates. The benzene polycarboxylic acid anhydrides or anhydro-acids or their mixtures are introduced by portions at temperatures of about 120–160° C. into these pre-warmed precursors, mixed with the polyamines or with a mixture of polyamines.

This addition leads to an immediate and violent release of water. The amount of the portion added depends on the maniability of the reaction mixture formed with regard to consistency and foaming, as is the number of the portions in which the predetermined total amount of the imide-former is distributed.

The temperature of the reaction charge is raised again after each addition, until the initial paste becomes more thinly flowing and the release of water subsides. Corresponding to the increase of melting temperature proportional to the increase of the imide-forming portion and to the degree of condensation, the kettle temperature is successively raised to about 220 to 240° C. The mixture is then boiled to clarity and water-free after the addition of the last portion of reactant and the condensation is finally completed under vacuum.

When preparing the mixed esters, it is possible to start from a mixture of the alcohols and a part or the whole amount of the diamines or amino alcohols. Since the amino groups react readily with the acid anhydrides, the reaction with the alcohols will be controlled to a certain extent with regard to the valency of the polycarboxylic acids. This will reduce the risk of an inhomogeneity at the end of the reaction. In the preparation of the hardening polyester resins, the formation of polyester-polyimides probably predominates, in proportion to the amount of water expelled during the reaction.

The reaction should be carried out to such an extent and the amino compounds be present in the reaction mixture only in such amounts that all of the amino groups are converted into imido groups.

As equivalents in the sense of the invention are understood the number of mols multiplied by the number of functional groups per molecule.

The condensation may be carried out under an atmosphere of inert gas, but this is not an essential condition, since this does not lead to drawbacks in the wire lacquer applications. The use of polar solvents, as required in the previously known processes, is not necessary in this process. Depending on the consistency of the starting materials used, it is even possible to work without solvents and/or carrier agents.

The processing of the impregnating solution, i.e. its deposition on the electrical conductors, is carried out on the conventional machines. The curing is effected in the usual manner at temperatures of about 400° C.

When preparing coatings of greater thickness, difficulties occur sometimes when the resin does not contain the indicated amount of zirconium or titanium. However, the properties of the resins are excellent even in this respect, when the polyester resins contain 0.05–0.5 g., preferably 0.1–0.2 g. of chemically bound zirconium or titanium per 100 g. of resin. This is particularly expedient. To effect the chemical binding of zirconium or titanium, an ester of zirconic or titanic acid, preferably butyl titanate, is reacted with the resin. This leads to an interchange of ester radicals and the zirconium or the titanium is condensed into the resin molecule. Other esters of zirconic or titanic acid, such as cresyl titanate, triolcylbutyl titanate, triethanolamine titanate, cetyl titanate, tetra-n-butyl pirconate may also be used. The commercially available butyl titanate is of a particularly good accessibility and is therefore preferred. Expediently, a resin is prepared at first from the other starting materials. This resin is then expediently diluted with solvents, preferably cresol. Such solvents are preferred, which are also used to prepare the impregnating solution. The addition of a small amount of solvent suffices, for example of 10%, calculated on the solid resin content. The zirconic or titanic acid ester is then added to this solution and the reaction mixture is heated to an elevated temperature, preferably to about 180° C. for a few minutes, for example 10 minutes.

However, the zirconic or titanic acid ester can also be added to the other reactants already at the beginning or during the preparation of the resin. It is particularly advantageous to add the zirconic or titanic acid ester to the second group of starting components indicated in the examples, which is expediently added in portions to the reaction mixture consisting of the first group of starting components.

It is particularly advantageous to employ polyester resins which contain, for every 16 equivalents of intracondensed terephthalic acid radicals—which may be substituted up to 30% by isophthalic acid radicals—about 88 equivalents of intracondensed ethylene glycol radicals—which may be substituted up to 20% by other aromatic or aliphatic glycol radicals—about 96 equivalents of intracondensed trimellitic acid radicals, about 24 equivalents of intracondensed 4,4'-diaminodiphenyl-methane radicals, about 8 equivalents of intracondensed p-aminobenzoic acid radicals and, possibly, for every 100 g. of resin, about 0.15–0.2 g. chemically bound titanium or zirconium.

It is known to add titanium esters, preferably butyl titanate, as mixture component to the impregnating solutions in the preparation of coatings on electrical conductors (see Examples 2b and 2c). Surprisingly, better results are obtained when, according to the process of the invention, the titanium or the zirconium is chemically bonded into the polyester resin mixture. Equally surprisingly, the amount of titanium or zirconium can be smaller in this process than when butyl titanate is added to the impregnating solutions according to the known processes, wherein a reaction takes place only on the electrical conductor during stoving. The process of the invention will be of particular advantage when using such impregnating solutions the polyester resins of which have a high content of imide groups or form such a high portion of imide groups, because here the chemically bound titanium or zirconium content substantially improves the flow properties of the lacquer.

The impregnating solution may contain usual hardeners, monomeric or polymeric butyl titanate, metal-resinates, octoates, or naphthenates as well as conventional flow promoters, e.g. silicone solution in xylene or toluene. If required, small amounts of extender resins can be added thereto, for example phenolic-, melamine- and urea-formaldehyde resins. There may be further added di- or polyisocyanates. Further modifications and gradual improvements can be achieved by the addition of thermally stable isocyanate-donors, such as the phenol urethane of the trimeric toluylene diisocyanate. The impregnating solutions are adjusted, in a known manner, to a concentration of about 35%.

After hardening, the electrical conductors according to the invention have a film consisting essentially of a cured polyesterimide which in its molecule contains for every 10 equivalents of intracondensed radicals of a benzene polycarboxylic acid having more than two carboxy groups and having two carboxylic groups in the orho-position to each other, possibly in mixture with radicals of terephthalic and/or isophthalic acid, about 5–16, preferably 7–10 equivalents of intracondensed di- and/or polyhydric lower aliphatic alcohol radicals, about 3–0.8 equivalents of radicals of diamines containing the groupment

which may be partly substituted by radicals of amino acids and/or amino alcohols, and wherein for every 10 equivalents of divalent radicals there are about 4–20, preferably 6–15 equivalents of polyfunctional radicals and which possibly for every 100 g. of resin may further contain 0.05 to 0.5, preferably 0.1–0.2 g. of chemically bound zirconium or titanium., The insulating coatings prepared according to the process of the invention have, in addition to a reduced thermoplasticity, an improved resistance to thermal shock in comparison to the known terephthalic acid polyesters and show a reduced thermal degradation through sublimation of the terephthalic acid. In the previously known products, the sublimation is particularly extensive at temperatures above 200° C. The thermal shock, appearing especially after mechanical stress (elongation), following a brief heating-up of electrical windings, which is sensibly increased by warm solvent treatment such as immersion or solvent-washing of refrigerator assemblies, often precludes the use of terephthalic acid polyester lacquers as wire coating in high-speed winding machines. The improvement of this thermal sensitivity reduces the number of rejects in the production of electrical assemblies and widens the scope of application of lacquered wires.

The tendency of fissuring of lacquered wires owing to thermal shock can be rapidly determined by winding the lacquered wires about their simple diameter and tempering for 15 minutes at 200° C.

The comparison of the resistance to thermal degradation can be effected by measuring the respective weight losses at temperatures above 200° C.

EXAMPLE 1

1.2 mols of terephthalic acid dimethyl ester (233 g.), 7 mols of ethylene glycol (434 g.) 50 g. of cresol as carrier, and 1 g. of zinc acetate are heated, until the theoretical amount of methanol is distilled off, which is achieved between 220–240° C. The temperature is hereafter lowered to 120–140° C. and a mixture consisting of 3 mols of trimellitic acid anhydride (576 g.)
1.1 mols of 4,4'-diaminodiphenylmethane (218 g.)

is added in five portions. After the addition of each portion the temperature is again raised to about 180–200° C., until the reaction mixture becomes thinly flowing. Once the addition is terminated, water is distilled off from the reaction mixture at temperatures up to about 260° C. until a clear resin is formed. Thereafter, the reaction mixture is further treated in water jet vacuum at 160–180° C. until a viscosity of about 2000 cp. in a 1,2-m-cresol solution is reached.

After adding 50–100 g. of cresol at 160–180° C., 8 g. of monomeric butyl titanate are added under intensive stirring at 180° C. The mixture is stirred for a further 10 minutes at this temperature, then cooled and diluted with cresol to a 50% solution. The titanium content is then about 0.1%, calculated on the solid resin content. From this solution, about 30% wire lacquer was prepared by addition of solvent naphtha and small amounts of usual hardeners, flow-promoters and cross-linking agents (isocyanates). (In other experiments, wire lacquers of 25–35% concentrations were prepared.)

This solution was employed to coat a copper wire of 0.8 mm. diameter on a horizontal wire coating machine according to the usual process. At a take-off speed of 6 metres/minute, in 8 passages, 2.7 metres oven length and an oven temperature of 400° C. a lacquer-coating of 62–65µ thickness was produced. Testing yielded the following values.

Winding strength after preliminary stretching _____ 30% elongation about a single-diameter winding; resistant to winding.
Pencil hardness (on delivery) _ 2H.
Scraping index according to Herberts - Works - Standard WN 2009 (see ETZ-edition B, No. 11, 1958, SW 17–423) __ 31.
Thermal shock:
   15 mins. at 200° C. single-winding _____ No cracks.
   15 mins. at 240° C. single-winding _____ Isolated crack formation, 2 out of 3 curls crackfree.
Adherence-index according to VSM 23713 _____ 406.
Thermoplasticity, percent:
   90 _____ 158° C.
   65–50 _____ 190–260° C.
   20 _____ 280° C.

EXAMPLE 2a 4.4 mols of ethylene glycol (274 g.), 0.6 mol of terephthalic acid (100 g.), 0.2 mol of isophthalic acid (34 g.), zinc acetate 0.4 g., and cresol 50 g. are esterified to the greatest possible extent by heating, until the theoretical amount of water has distilled off. The temperature is raised to about 200° C. during this step. The temperature is then reduced to 150° C. and a mixture consisting of 3.2 mols of trimellitic acid anhydride (615 g.)
1.2 mols of 4,4'-diaminodiphenylmethane (238 g.)
0.4 mol of p-aminobenzoic acid (55 g.)

is added in six portions. After the addition of each portion, the temperature is raised to about 200° C., temperature at which the reaction mixture becomes thinly flowing. The reaction temperature is lowered to 150–175° C. before adding the next portion. After addition of the last portion, 50 g. of cresol are added to the reaction mixture and the temperature is raised to about 260° C. The reaction is terminated when no further amounts of water are separated from the reaction mixture.

To this resin melt there are added 100 g. of cresol, followed by the addition, at 180° C., of 15 g. of monomeric butyl titanate with stirring. This amount corresponds to about 3.6 g. of titanium dioxide or 2.1 g. of titanium. The mixture is stirred at this temperature for further 10 minutes, then cooled and diluted with solvents. The titanium content is about 0.17% of the solid resin content. The preparation of the coating solution and the coating of the electrical conductor are carried out as in Example 1.

EXAMPLE 2b

The preparative method was that of Example 2a, with the difference that the butyl titanate was not condensed in. From the resin thus obtained, there was prepared in the manner described in Example 1 a wire lacquer with a solid content of 31.5%. To this lacquer there were added, per kg. of lacquer solution, 23 g. of a 33% solution of monomeric butyl titanate in cresol. The titanium content amounts to about 0.6%, calculated on the solid resin content. This lacquer was then employed to coat a copper wire in the manner described in Example 1.

EXAMPLE 2c

The resin was prepared in the manner described in Example 2b, with the difference that the resin was condensed to a greater extent by distilling off residual water for an additional 10 hours at 240° C. after completion of the reaction and, in addition, excess ethylene glycol was removed in a water-jet vacuum. The preparation of the lacquer was carried out as described in Example 1. The solid content was about 30%. Butyl titanate was added to this lacquer in the amount indicated in Example 2b, whereby a titanium content of 0.5% was reached, calculated on the solid resin content. The lacquer was then employed to coat a copper wire in the manner described in Example 1.

The values given in Tables 1 and 2 show, that the coating obtained according to the method of Example 2a is superior in quality to the coatings prepared according to the comparative Examples 2b and 2c.

TABLE 1

| | Thickness of coating ($\mu$) | Characteristics of the coating |
|---|---|---|
| Example 2a | 55–60 | Smooth. |
| | 85–90 | Smooth. |
| | >90 | Isolated fine bubbles only. |
| Example 2b | 55–60 | Inhomogeneous. |
| | 70–80 | Strongly inhomogeneous, isolated bubbles. |
| Example 2c | 53–58 | Inhomogeneous. |
| | 78–85 | Inhomogeneous, isolated bubbles. |

TABLE 2

| | Ductility of lacquer film, percent | Hardness | Adherence index | Scraping index | Stoving test, mins. | Thermoplasticity | Thermal shock 1×φ (°C.) |
|---|---|---|---|---|---|---|---|
| Example 2a | (¹) | 2H | 525 | 25 | 14.7 | 90%—165° 25%—250° 6%—300° | 300 |
| Example 2b | 20 | 2H | 441 | 12 | 13.5 | 90%—160° 32%—250° 10%—300° | 240 |
| Example 2c | 15 | 2H | 465 | 8 | 14.4 | 90%—165° 44%—250° 10%—300° | 240 |

¹ Resistant to winding.

Thermoplasticity is determined as described in Example 14 hereinafter. It indicates the percentage of the original diameter of the coated wire at the indicated temperature after the test period.

EXAMPLE 3

1 mol of terephthalic acid dimethyl ester (192 g.), 6 mols of ethylene glycol (372 g.), 50 g. of Rosol as carrier, and 1 g. of zinc acetate are heated as in Example 1, until the theoretical amount of methanol is distilled off, which is achieved between 220 and 240° C. The temperature is then lowered to 120–140° C. and a mixture consisting of 3 mols of trimellitic acid anhydride (576 g.)
1 mol of 4,4'-diaminodiphenylmethane (218 g.)

is added in 4 equal portions, in the manner described in Example 1. The addition of the third portion is preceded by an addition of 8 g. of monomeric butyl titanate, undiluted or diluted with a small volume of cresol. After about 10 minutes stirring, the third and furth portions of the mixture are introduced in the afore described manner. Further processing is carried out according to the method of Example 1. The titanate content amounts to approximately 0.1% of the solid resin content. The preparation of the coating solution and the deposition of the coating on the electric conductor are carried out as in Example 1. The thickness of the coating is 58–60$\mu$. Testing yielded the following values.

Winding strength after preliminary stretching _____ 30% elongation about 1×φ, resists winding.
Pencil hardness on delivery _____ 2H.
Scraping-index according to Herberts-Works-Standard WN 2009 _____ 23.
Adherence index according to VSM 23713 _____ 432.
Puncture voltage _____ 3880 v.
Thermal shock:
  15 min., 200° C. _____ 1×φ, 2 out of 3 curls are free from fissures, 1 curl shows one fissure.
  15 min., 240° C. _____ 1×φ, 2 of these curls are free from fissures, 1 curl shows one fissure.

EXAMPLE 4

The operative procedure is the same as in Example 1, with the difference however that instead of the 8 g. of butyl titanate, 12 g. of an approximately 30% solution of tetra-n-butyl-zirconate in butanol are added. The zirconate content of the resulting product is approximately 0.1% of the resin solid content. A lacquer coating of 43–53$\mu$ was obtained. Testing yielded the following results.

Winding strength after preliminary stretching _____ 30% elongation about 1×φ, resists winding.
Pencil hardness on delivery _____ 2H.
Scraping-index according to Herberts-Works-Standard WN 2009 _____ 17.
Puncture voltage _____ 3960 v.
Thermal shock:
  15 min., 200° C. _____ None.
  15 min., 240° C. _____ 1×φ, 1, 0, 0.

EXAMPLE 5

4.48 mols of ethylene glycol (278 g.), 0.6 mol of terephthalic acid (100 g.), 0.2 mol of isophthalic acid (34 g.), zinc acetate 0.5 g., and cresol 50 g. are esterified to the greatest possible extent by heating until the theoretical amount of water has been distilled off, the temperature being raised during this step to 200° C. The temperature is then reduced to 150° C. and a mixture consisting of 2.92 mols of trimellitic acid anhydride (560 g.)
1.12 mols of 4,4'-diaminodiphenylmethane (222 g.)

is added in six portions. During the addition of the individual portions, the temperatures are increased as follows:

|  | °C. |
|---|---|
| 1st portion | From 155 to 205 |
| 2nd portion | From 160 to 210 |
| 3rd portion | From 170 to 215 |
| 4th portion | From 175 to 225 |
| 5th portion | From 185 to 260 |

After addition of the last portion, the melt is kept at a temperature of 250° C. until no more water distills off. After cooling to 220° C., 200 g. of cresol are stirred into the melt, followed by the addition of 7.5 g. of monomeric butyl titanate, whereafter the temperature is kept at 180° C. for two hours. The titanium content is approximately 0.15% $TiO_2$, or about 0.09% titanium, calculated on the resin solid content.

EXAMPLE 6

3.35 mols of terephthalic acid dimethyl ester (650 g.), 3.3 mols of ethylene glycol (205 g.), 2 mols of glycerin (184 g.), Zn-acetate 0.5 g., and cresol as carrier 50 g. are heated until about 95% of the theoretical amount of methanol has been distilled off, which is achieved at a kettle temperature of 220–240° C. The temperature is then lowered to 120–140° C. and a mixture consisting of 1.15 mols of trimellitic acid anhydride (220 g.)
0.5 mol of 4,4'-diaminodiphenylmethane (99 g.)

is added in four portions. The temperature is again increased after the addition of each of the portions, until the reaction mixture becomes thinly flowing, and the initially spontaneous apparition of water has subsided. After completing the addition, water is distilled off from the mixture until a clear resin is formed. This product is then further treated in vacuum until a viscosity of 1400–1500 cp. is reached, measured in a 1:2 m-cresol solution. The resin is then diluted to a 50% solution with cresol. A 35% wire lacquer was prepared from this solution, using hardeners, flow promoters and cross-linking agents (isocyanates) and extended with 20 parts of solvent naphtha.

A copper wire was coated in the manner described in Example 1, at a take-off speed of 5.0 metres/minute. A lacquer coating of 65–66/µ thickness was obtained which gave the following test values.

Winding strength after 15% preliminary stretching ___ $1 \times \phi$, free of cracks.
Pencil hardness _____ 3H.
Scraping-index according to Polenz, ETZ-Edition B No. 11, (1958, pp. 417–423) _ 75.
Puncture voltage _____ 7050 v.
Thermal shock:
    15 min., 180° C. ____ $1 \times \phi$, no fissures.
    15 min., 200° C. ____ $2 \times \phi$, isolated fissures (3–5).

EXAMPLE 7

2.5 mols of terephthalic acid dimethyl ester (485 g.)
3 mols of ethylene glycol (186 g.)
2 mols of glycerine (184 g.)
Zn-acetate 0.5 g.
Cresol 50 g.
2.5 mols of trimellitic acid anhydride (480 g.)
1 mol of 4,4'-diaminodiphenylmethane (198 g.)

Method of preparation as in Example 6. Coating process as in Example 1, at a take-off speed of 5 metres. Thickness of coating 64–73µ. Testing yield the following values.

Winding strength after preliminary stretching _____ 5%.
Initial pencil-hardness ____ 2H.
Scraping index according to Polenz ETZ-Edition B, No. 11, (1958, pp. 417–423) _____ 56.
Puncture voltage _____ 7650 v.
Thermal shock 15 min., 180° C. _____ $1 \times \phi$, no cracks.

EXAMPLE 8

2.25 mols of terephthalic acid dimethyl ester (437 g.)
3.5 mols of ethylene glycol (217 g.)
2 mols of glycerine (184 g.)
Zn-acetate 0.5 g.
cresol 50 g.
3 mols of trimellitic acid anhydride (576 g.)
1.25 mols of p,p'-diaminodiphenylmethane (247 g.)

Method of preparation as in Example 6. Coating process as in Example 1. Thickness of coating: 49–57µ. The following values were observed on testing.

Winding strength after preliminary stretching _____ 10%.
Initial pencil hardness _____ 2H.
Scraping index according to Polenz ETZ-Edition B, No. 11 (1958, pp. 417–423) _ 23.
Puncture voltage _____ 4670 v.
Thermal shock:
    15 min., 180° C. _____ $1 \times \phi$, no fissures.
    15 min., 200° C. _____ $1 \times \phi$, isolated cracks.

EXAMPLE 9

3.5 mols of ethylene glycol (217 g.), 2 mols of glycerin (184 g.), and Zn-acetate, 0.5 g., are heated to 120° C., whereupon a mixture consisting of 4 mols of trimellitic acid anhydride (768 g.)
1.75 mols of 4,4'-diaminodiphenylmethane (346 g.)

is added in 8 portions. The temperature is raised after each addition until the reaction paste becomes thinly flowing, which then allows the addition of a fresh portion. The temperature is to be lowered to 140–160° C. on each addition to avoid unnecessary foaming. After introducing the last portion, water is distilled off from the reaction mixture, until the resin formed becomes clear. The distillation is then continued in vacuum at 140° C. until a viscosity of 1400 cp. is reached in a 1:2 m-cresol solution. The resin thus obtained is dissolved in cresol and processed into a lacquer as in Example 6. Thickness of coating: 56–66µ. Testing yielded the following values.

Winding strength after preliminary stretching _____ 10%.
Initial pencil hardness _____ 3H.
Scraping-index according to Polenz ETZ-Edition B, No. 11 (1958, pp. 417–423) _ 25.
Puncture voltage _____ 6000 v.
Thermal shock:
    15 min., 240° C. ____ $1 \times \phi$, no cracks.
    15 min., 260° C. ____ $1 \times \phi$, isolated cracks.

EXAMPLE 10

8 5 mols of ethylene glycol (572.0 g.); 3.5 mols of trimellitic acid anhydride (672.5 g.), zinc acetate, 0.4 g., 0.5 mol of trimellitic acid anhydride (96.0 g.), 0.25 mol of 4,4'-diaminodiphenylmethane (49.5 g.), and 3.5 mols of trimellitic acid anhydride are introduced by portions into ethylene glycol at 70–100° C. The melt is kept for one hour at 135° C., whereupon the esterification catalyst is added and water is distilled off slowly (110 ml.) while the temperature is raised to 200° C. After cooling to 160° C., the mixture of trimellitic acid anhydride and 4,4'-diaminodiphenylmethane is added in a single portion, which which dissolves immediately, i.e. the solution clears very quickly. It is then further heated to 215° C., whereby a further 27 ml. of water distill over. The total amount of distillate corresponds fairly well to the theoretical amount. After distilling for 30 minutes in water-jet vacuum at 175–180° C., further 50 ml. of distillate, primarily ethylene glycol distill over, so that the total amount of distillate is 117 ml. Further processing is carried out as in Example 6.

EXAMPLE 11

6.0 mols of ethylene glycol (3.72.0 g.)
2.0 mols of trimellitic acid anhydride (384.0 g.)
Zn-acetate, 0.4 g.
2.0 mols of trimellitic acid anhydride (384.0 g.)
1.0 mol of p,p′-diaminodiphenylmethane (198.0 g.)

The preparation of the resin solution and the coating are carried out as in Example 6.

EXAMPLE 12

3.0 mols of ethylene glycol (186.0 g.)
1.0 mols of ethanolamine (61.0 g.)
2.0 mols of trimellitic acid anhydride (384.0 g.)
Zn-acetate, 0.4 g.
1.0 mol of trimellitic acid anhydride (192.0 g.)
0.5 mol of p,p′-diaminodiphenylmethane (99.0 g.)

The preparation of the resin solution and the coating are carried out according to Example 6.

EXAMPLE 13

8.0 mols of ethylene glycol (496.0 g.)
0.4 mol of trimellitic acid anhydride (77.0 g.)
1.6 mols of pyromellitic acid dianhydride (349.0 g.)
Zn-acetate, 0.4 g.
0.8 mol of trimellitic acid anhydride (154.0 g.)
0.4 mol of p,p′-diaminodiphenylmethane (79.0 g.)

The preparation of the resin solution and the coating are carried out as in Example 6.

EXAMPLE 14

3.35 mols of terephthalic acid (2224.0 g.)
3.6 mols of ethylene glycol (892.8 g.)
2.0 mols of glycerin (740.0 g.)
Zn-acetate, 2.0 g.
1.125 mols of trimellitic acid anhydride (864.0 g.)
0.5 mol of 4,4′-diaminodiphenylmethane (396.0 g.)

Half of the terephthalic acid is introduced into the mixture of ethylene glycol and glycerine which has been preheated to 160° C. and condensed therein at a temperature of 210° C., until about 100 ml. of water have distilled over. The rest of the terephthalic acid is then added and the condensation is continued until the melt has become clear and 480 ml. of water have been distilled off. Care must be taken here that the temperature at the head of the column does not exceed 110° C. This can be achieved by maintaining the kettle temperature at about 210° C. Hereafter, the temperature is lowered to 120–140° C. and the mixture of diamine and trimellitic acid is added in three portions. The temperatures are immediately raised after each addition to 180° C. and 250° C. at the end of the condensation. The resin solution is prepared and the coating is carried out according to the method of Example 6.

To determine the evaporation losses, an 0.8 mm. copper wire was coated with an approximately 60µ thick layer of a known terephthalic acid polyester wire lacquer (reference), hardened in the usual manner and compared with the insulated wires obtained according to Examples 6 and 9. The evaporation losses were measured in each case after 72 hours, 96 hours and 120 hours' storage at 250° C. The results of these experiments are given in the following table:

| | Terephthalic-acid polyester wire lacquer (reference) (percent) | Example 6 (percent) | Example 9 (percent) |
|---|---|---|---|
| 72 hrs., 250° C | 52.1 | 28.5 | 6.1 |
| | 54 | 28.4 | 6.1 |
| 96 hrs., 250° C | 61.3 | 32.3 | 7.3 |
| | 62.7 | 32.4 | 7.3 |
| 120 hrs., 250° C | (¹) | 35.8 | 8.3 |
| | | 35.6 | 8.4 |

¹ Coating crumbles.

To evaluate the thermoplasticity, the temperature at which the insulating lacquer layers of 10 rectangularly crossed wires (Cu, 0.8 mm. diameter) were indented by (1) 5% and (2) 10% of their initial thickness, under a constant load of 350 g. and a continuously increasing temperature of 120° C. per hour:

| Example | Indentation-temperature (° C.) for— | |
|---|---|---|
| | 5% | 10% |
| 6 | 167 | 186 |
| 7 | 152 | 166 |
| 8 | 160 | 172 |
| 9 | 200 | 210 |
| Terephthalic acid-polyester wire lacquer (reference) | 145 | 160 |

For further details of the method of the thermoplasticity test see F. Polenz, A Study of the Thermoplastic Behavior of Enameled Magnet Wire, in Insulation, June 1960.

What we claim is:

1. The process of producing a polyester polyimide resin substantially free of amido groupments which process comprises heating within the range of from about 100° C. to about 270° C. a starting mixture consisting essentially of (1) per each 10 equivalents of a member selected from the group consisting of the benzene polycarboxylic acids having more than two carboxy groups and having two of said carboxy groups in the ortho-position to each other, the anhydrides of said polycarboxylic acids, and mixtures of said members with a benzene dicarboxylic acid compound selected from the group consisting of terephthalic acid and isophthalic acid, mixtures thereof, the lower alkyl esters of said acids, and mixtures of said esters, (2) from about 5 to 16 equivalents of a member selected from the group consisting of the dihydric lower aliphatic alcohols, the polyhydric lower aliphatic alcohols having more than two hydroxy groups, and mixtures of said members, and (3) from about 3 to 0.8 equivalents of a member selected from the group consisting of the diamines containing the groupment

and mixtures of such diamines, said starting mixture containing said di- and polycarboxylic acid compounds and said di- and polyhydric alcohols in proportions corresponding to from about 4 to 20 equivalents of the polycarboxylic acids and polyhydric alcohol components per each 10 equivalents of dicarboxylic acid and dihydric alcohol components, until no further amounts of water are separated from the reaction mixture, adding thereto a lacquer solvent in an amount of up to 10%, calculated on the solid resin content, and an organic ester of an acid selected from the group consisting of zirconic and titanic acid in an amount corresponding to from about 0.05 to 0.5 g. of the element selected from the group consisting of titanium and zirconium per each 100 g. of resin, and heating the reaction mixture to the elevated temperature for a few minutes.

2. Process of claim 1 wherein the diamine compounds of the starting mixture are partly substituted by a monoamine compound selected from the group consisting of the aminobenzene carboxylic acids and of the amino lower aliphatic alcohols and the aminophenols, the amino compounds being present in the starting mixture only in such amounts that after the reaction being carried out, all of the amino groups are converted into imido groups.

3. The process of claim 1 wherein the benzene polycarboxylic acid is 1,2,4-benzene tricarboxylic acid.

4. The process of claim 1 wherein the benzene polycarboxylic acid is 1,2,4,5-benzene tetracarboxylic acid.

5. The process of claim 1 wherein the dihydric lower aliphatic alcohol is ethylene glycol.

6. The process of claim 1 wherein the polyhydric lower aliphatic alcohol is glycerol.

7. A polyester polyamide resin substantially free of amido groupments consisting essentially of the product of reaction obtained by heating a starting mixture consisting essentially of (1) per each 10 equivalents of a member selected from the group consisting of the benzene polycarboxylic acids having more than two carboxy groups and having two of said carboxy groups in the ortho-position to each other, the anhydrides of said polycarboxylic acids, and mixtures of said members with a benzene dicarboxylic acid compound selected from the group consisting of terephthalic acid and isophthalic acid, mixtures thereof, the lower alkyl esters of said acids, and mixtures of said esters, (2) from about 5 to 16 equivalents of a member selected from the group consisting of the dihydric lower aliphatic alcohols, the polyhydric lower aliphatic alcohols having more than two hydroxy groups, and mixtures of said members, and (3) from about 3 to 0.8 equivalents of a member selected from the group consisting of the diamines containing the groupment

and mixtures of such diamines, said starting mixture containing said di- and polycarboxylic acid compounds and said di- and polyhydric alcohols in proportions corresponding to from about 4 to 20 equivalents of the polycarboxylic acid and polyhydric alcohol components per each 10 equivalents of dicarboxylic acid and dihydric alcohol components, at a temperature in the range of about 100° C., to about 270° C., until no further amounts of water are separated from the reaction mixture, adding thereto a lacquer solvent thereto in an amount of up to 10%, calculated on the solid resin content, and an organic ester of an acid selected from the group consisting of zirconic and titanic acid in an amount corresponding to from about 0.05 to 0.5 g. of the element selected from the group consisting of titanium and zirconium per each 100 g. of resin, and heating the reaction mixture to the elevated temperature for a few minutes.

8. A composition of matter consisting essentially of a cresol as a solvent and a polyester polyimide resin substantially free of amido groupments consisting essentially of the product of reaction obtained by heating a starting mixture consisting essentially of (1) per each 10 equivalents of a member selected from the group consisting of the benzene polycarboxylic acids having more than two carboxy groups and having two of said carboxy groups in the ortho-position to each other, the anhydrides of said polycarboxylic acids, and mixtures of said members with a benzene dicarboxylic acid compound selected from the group consisting of terephthalic acid and isophthalic acid, mixtures thereof, the lower alkyl esters of said acids, and mixtures of said esters, (2) from about 5 to 16 equivalents of a member selected from the group consisting of the dihydric lower aliphatic alcohols, the polyhydric lower aliphatic alcohols having more than two hydroxy groups, and mixtures of said members, and (3) from about 3 to 0.8 equivalents of a member selected from the group consisting of the diamines containing the groupment

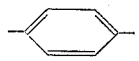

and mixtures of such diamines, said starting mixture containing said di- and polycarboxylic acid compounds and said di- and polyhydric alcohols in proportions corresponding to from about 4 to 20 equivalents of the polycarboxylic acid and polyhydric alcohol components per each 10 equivalents of dicarboxylic acid and dihydric alcohol components, at a temperature in the range of about 100° C., to about 270° C., until no further amounts of water are separated from the reaction mixture, adding thereto a lacquer solvent thereto in an amount of up to 10%, calculated on the solid resin content, and an organic ester of an acid selected from the group consisting of zirconic and titanic acid in an amount corresponding to from about 0.05 to 0.5 g. of the element selected from the group consisting of titanium and zirconium per each 100 g. of resin, and heating the reaction mixture to the elevated temperature for a few minutes.

9. An insulated electrical conductor consisting essentially in combination, of an electrical conductor and a coating consisting essentially of a cured polyester polyimide resin substantially free of amido groupments, said polyester polyimide resin substantially free of amido groupments consisting essentially of the product of reaction obtained by heating a starting mixture consisting essentially of (1) per each 10 equivalents of a member selected from the group consisting of the benzene polycarboxylic acids having more than two carboxy groups and having two of said carboxy groups in the ortho-position to each other, the anhydrides of said polycarboxylic acids, and mixtures of said members with a benzene dicarboxylic acid compound selected from the group consisting of terephthalic acid and isophthalic acid, mixtures thereof, the lower alkyl esters of said acids, and mixtures of said esters, (2) from about 5 to 16 equivalents of a member selected from the group consisting of the dihydric lower aliphatic alcohols, the polyhydric lower aliphatic alcohols having more than two hydroxy groups, and mixtures of said members, and (3) from about 3 to 0.8 equivalents of a member selected from the group consisting of the diamines containing the groupment

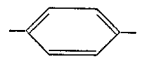

and mixture of such diamines, said starting mixture containing said di- and polycarboxylic acid compounds and said di- and polyhydric alcohols in proportions corresponding to from about 4 to 20 equivalents of the polycarboxylic acid and polyhydric alcohol components per each 10 equivalents of dicarboxylic acid and dihydric alcohol components, at a temperature in the range of about 100° C., to about 270° C., until no further amounts of water are separated from the reaction mixture, adding thereto a lacquer solvent thereto in an amount of up to 10%, calculated on the solid resin content, and an organic ester of an acid selected from the group consisting of zirconic and titanic acid in an amount corresponding to from about 0.05 to 0.5 g. of the element selected from the group consisting of titanium and zirconium per each 100 g. of resin, and heating the reaction mixture to the elevated temperature for a few minutes.

References Cited

UNITED STATES PATENTS

| | | | |
|---|---|---|---|
| 2,547,113 | 4/1951 | Drewitt et al. | 260—75 |
| 2,917,414 | 12/1959 | McLean | 260—75 |
| 3,053,783 | 9/1962 | Broadhead et al. | 260—75 |
| 3,238,181 | 3/1966 | Anderson | 260—75 |
| 2,856,385 | 10/1958 | Van Den Berghe et al. | 260—75 |
| 3,179,634 | 4/1965 | Edwards | 260—78 |
| 3,211,585 | 10/1965 | Meyer et al. | 260—75 |

WILLIAM H. SHORT, *Primary Examiner.*

R. T. LYON, *Assistant Examiner.*